United States Patent

Klosinski et al.

[11] Patent Number: 6,062,127
[45] Date of Patent: May 16, 2000

[54] PORTABLE ESPRESSO MAKER

[76] Inventors: Boguslaw Klosinski, 285 Marlin St., Dix Hills, N.Y. 11746; Anthony Leone, 548 Sunrise Hwy., West Babylon, N.Y. 11704

[21] Appl. No.: 09/374,276

[22] Filed: Aug. 13, 1999

[51] Int. Cl.[7] ............................. A47J 31/057; A47J 31/04
[52] U.S. Cl. .................................................. 99/303; 99/295
[58] Field of Search ............................. 99/303, 295, 293, 99/302 R, 322

[56] References Cited

U.S. PATENT DOCUMENTS

| | | | |
|---|---|---|---|
| 1,981,402 | 11/1934 | Valls | 99/303 |
| 2,688,911 | 9/1954 | Hochmayr . | |
| 3,955,713 | 5/1976 | Hurley | 222/129.4 |
| 4,382,402 | 5/1983 | Alvarez | 99/295 |
| 4,495,404 | 1/1985 | Carmichael | 219/281 |
| 4,660,466 | 4/1987 | Fries et al. | 99/294 |
| 5,377,581 | 1/1995 | Campbell | 99/295 |
| 5,699,718 | 12/1997 | Yung et al. | 99/303 |
| 5,902,620 | 5/1999 | Nolan | 99/303 |

FOREIGN PATENT DOCUMENTS

| | | | |
|---|---|---|---|
| 797719 | 5/1936 | France | 99/303 |
| 1085694 | 2/1955 | France | 99/303 |
| 275146 | 6/1930 | Italy | 99/303 |

*Primary Examiner*—Reginald L. Alexander
*Attorney, Agent, or Firm*—Collard & Roe, P.C.

[57] ABSTRACT

A portable espresso maker comprising a housing and a water chamber within the housing and having an o-ring mounted on the top edge. There is a heating element adjacent the bottom of the water chamber. There is a bottom tray for holding the housing and a cup positioned on the bottom tray adjacent the housing. A filter assembly is positioned within the water chamber and comprises a filter tube connected to a reservoir. A mesh screen extends over the bottom of the reservoir. A cover is positioned over the housing and the water chamber. The cover has an o-ring that engages the o-ring mounted to the water chamber to create an air-tight seal between the water chamber and the cover. The cover has a concave recess and a screen extending over the concave recess. There are a plurality of ridges positioned within the recess and extending to the screen. An exit spout extends from the recess out of the cover and toward the cup. A prepackaged coffee packet is placed on the screen of the filter element and the cover is mounted to the housing so that the ridges press against the screen of the cover element to compress the coffee. Water in the water chamber is heated by the heating element and travels up through the filter tube and the coffee packet between the screens and exits out the exit spout into the cup to make a single cup of brewed espresso.

13 Claims, 5 Drawing Sheets

PORTABLE ESPRESSO MAKER

BACKGROUND OF THE INVENTION

1. Field of the Invention

This invention relates to a portable espresso maker. In particular, the invention relates to a coffee maker that brews a single cup of espresso and which can be used in an automobile, boat or other location.

2. The Prior Art

Portable coffee makers are known. For example, U.S. Pat. No. 4,382,402 to Alvarez discloses a coffee maker for use in an automobile or other location that uses prepackaged ground coffee. The coffee maker has a water chamber, a heating element and a percolator to force the water through the coffee maker to flow through the coffee packet and down into the cup. The coffee maker plugs into the automobile's cigarette lighter.

Another coffee maker is shown in U.S. Pat. No. 5,377,581 to Campbell. This coffee maker also plugs into the automobile's cigarette lighter and has a water chamber, a heating element and a cup for receiving the brewed coffee. Another such device is shown in U.S. Pat. No. 4,495,404 to Carmichael, which discloses a beverage brewing kit having a water chamber, a heating element and packets of beverage materials, such as powdered coffee and tea, sugar and creamer. Another portable coffee making apparatus is shown in U.S. Pat. No. 3,955,713 to Hurley. This device also has a water chamber, a heater and various compartments for holding the coffee making items, such as instant coffee, creamer and sugar.

A portable coffee maker for use in a microwave is shown in U.S. Pat. No. 5,902,620 to Nolan. This device has a water chamber, a percolation tube, a coffee chamber and coffee reservoir for the brewed coffee. The heat from the microwave causes the water to travel up the tube, through the coffee and out into a coffee reservoir.

While these devices are suitable for preparing standard brewed or instant coffee, they are not suited for preparing a cup of espresso type coffee, which requires that the heated water travel under great pressure through a compressed amount of espresso-type coffee. Special espresso makers have been around for a long time. For example, U.S. Pat. No. 2,688,911 to Hochmayr and U.S. Pat. No. 4,660,466 to Fries et al. disclose espresso makers. However, these devices are not suitable for automobile use, and are more suited for brewing multiple cups of espresso.

SUMMARY OF THE INVENTION

It is therefore an object of the invention to provide an espresso maker that can be used in an automobile, boat or other moving vehicle, and that also is suitable for home or office use.

It is another object of the invention to provide a portable espresso maker that brews a single cup of authentic espresso within a few minutes.

It is another object of the invention to provide a portable espresso maker that is simple to operate and clean.

It is a further object of the invention to provide a portable espresso maker that is simple and inexpensive to manufacture.

These and other objects of the invention are accomplished by a portable espresso maker comprising a housing and a water chamber disposed within the cavity of the housing and having an o-ring mounted on the top edge of the water chamber. There is a heating element disposed between the bottom of the housing and the water chamber and an electrical cord connected to said heating element for connecting the heating element to a power source such as an automobile cigarette lighter or a wall outlet.

There is a bottom tray for holding the housing and a cup positioned on the bottom tray adjacent the housing. A filter assembly is positioned within the water chamber and comprises a filter tube connected to a reservoir at a top end of the filter tube. There is a mesh screen extending over the bottom of the reservoir to divide the reservoir into upper and lower sections. A prepackaged coffee package is placed on the screen to reside in the upper section of the reservoir. Typically, the coffee package consists of a paper-like filter material enclosing a premeasured amount of ground coffee. Alternatively, loose ground coffee could be placed directly into the filter element.

A cover is positioned over the housing and the top edge of the side wall of the water chamber. The cover has an o-ring that engages the o-ring mounted to the water chamber to create an air-tight seal between the water chamber and the cover. The o-rings are preferably made of silicon. The cover has a concave recess beneath the top and a screen extending over the concave recess. There are a plurality of ridges positioned within the recess and extending to the screen. The ridges are preferably arranged in a hub and spoke pattern so that they extend out from a common center toward the edges of the cover. An exit spout extends from the recess out of the cover and toward the cup positioned next to the espresso maker.

The prepackaged coffee packet is placed between the screen of the filter element and the screen of the cover and is compressed by mounting the cover to the housing. At this point, the ridges press against the screen of the cover element to compress the coffee further. Water in the water chamber is heated by the heating element and travels up through the filter tube and through the coffee packet between the screens and exits out the exit spout into the cup.

The key to making a good cup of espresso is having the hot water be under great pressure and having the coffee be tightly compressed in its filter. The espresso is brewed by forcing the water through the compressed coffee and out into a cup. The present invention accomplishes the high pressure through the use of the o-rings which create an air-tight seal in the water chamber. The heat from the heating element creates the pressure to force the water through the coffee. The screens and the ridges in the cover serve to compress the coffee when the cover is mounted to the housing.

The water chamber is preferably made of stainless steel or teflon coated aluminum and the cover and housing are made of acetal. In a preferred embodiment, the bottom tray has indentations for the housing and the cup to keep the cup and housing from spilling over in turbulence. To mount the cover to the housing, the cover has internal threads and the housing has external threads and the cover is screwed onto the housing via the threads.

In an alternative embodiment, the prepackaged coffee packet is a foil package such as that produced by Néstle. In this embodiment, the screen on the filter element is removed and there is a blade extending into the reservoir for puncturing the foil package when it is placed in the reservoir. The cover does not have a screen either. Instead, there are several spikes mounted on the underside of the cover that also puncture the coffee package from the top to allow the water to flow through. With this embodiment, compressing the coffee is not required since the coffee packet itself compresses the coffee sufficiently.

The invention preferably has a thermal element, which shuts the espresso maker off after a brewing cycle has been completed. To initiate a new brewing cycle, the user must unplug the espresso maker and plug it back in again. This is a safety measure to ensure that the espresso maker is not left on in a heating mode after a brewing cycle.

The present invention provides a compact, simple device for preparing a single cup of brewed espresso in a moving vehicle or in an interior environment, without any risk of spillage.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
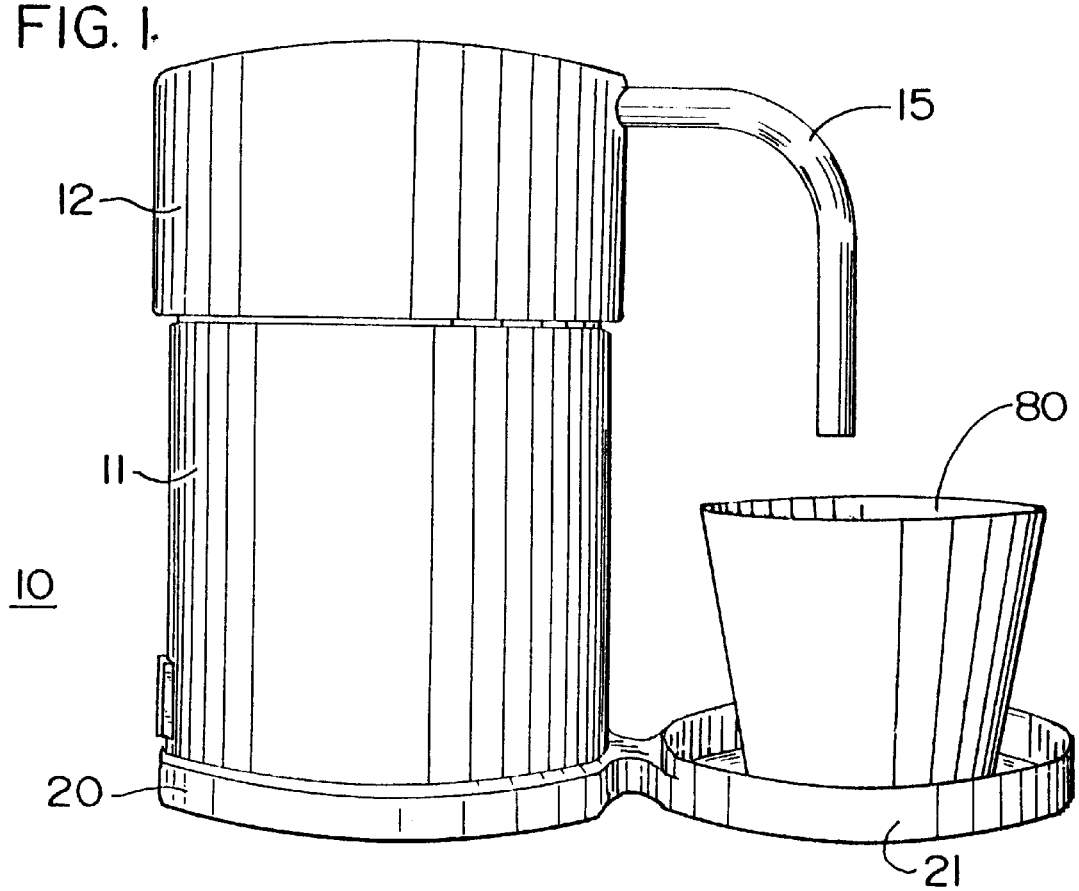
FIG. 1 shows a side view of the espresso maker according to the invention as assembled.
Figure 2:
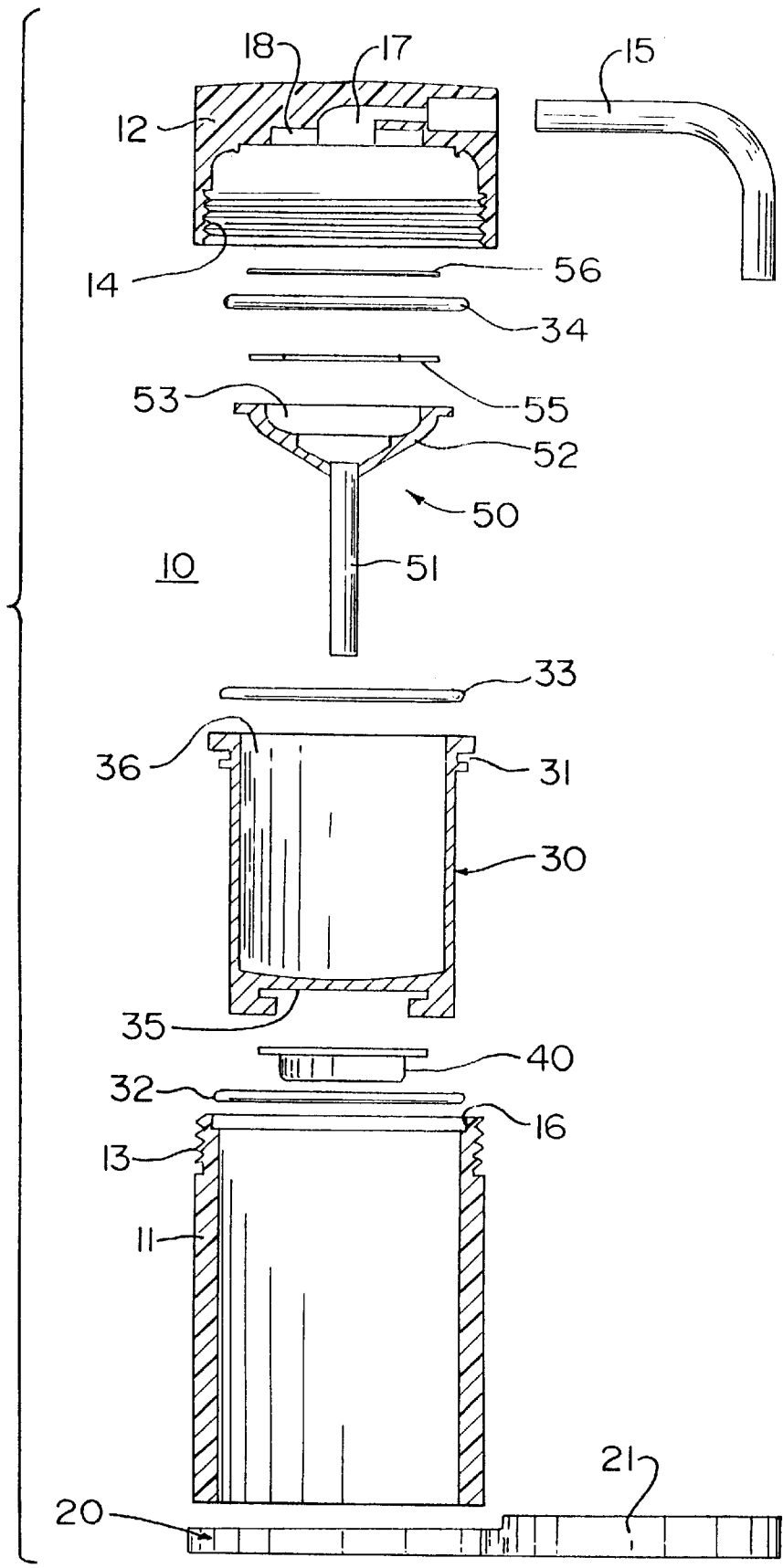
FIG. 2 shows an exploded view of the espresso maker.
Figure 3:
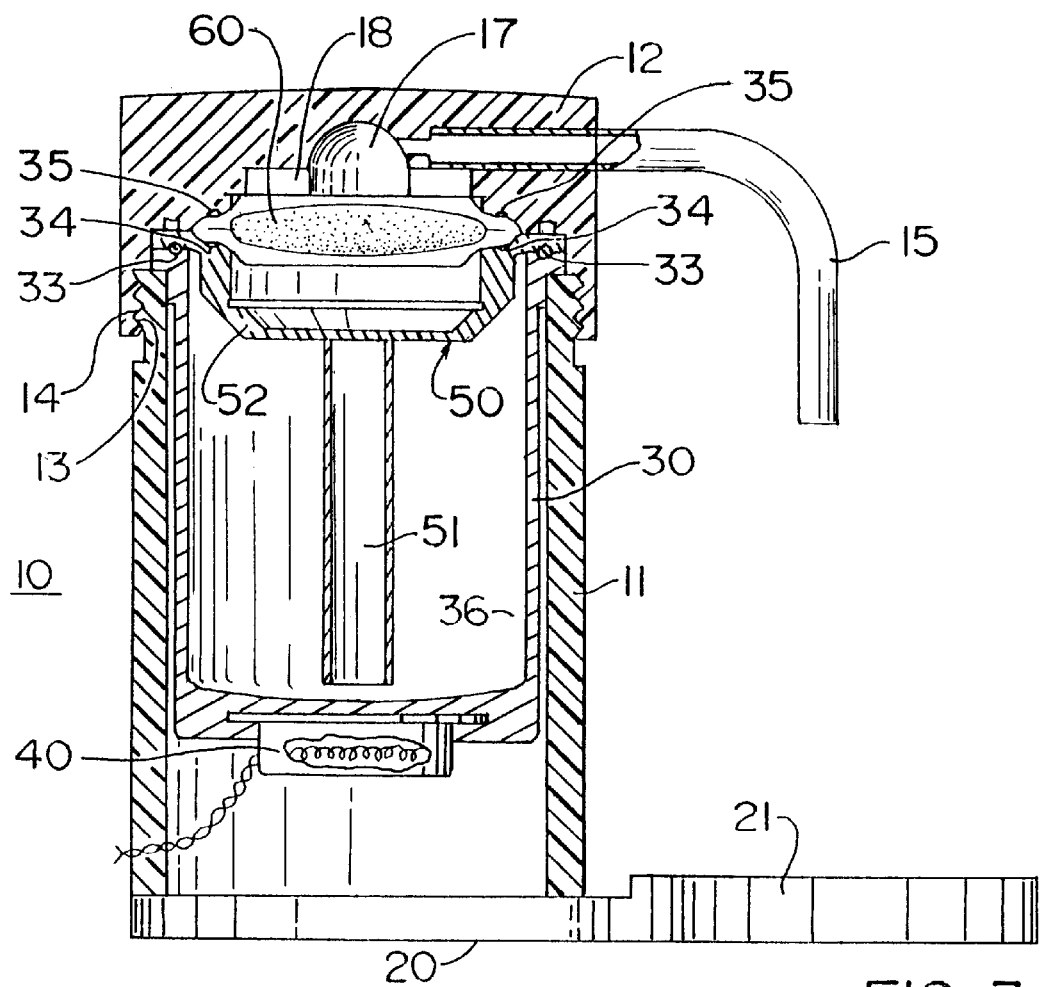
FIG. 3 shows a side cross-sectional view of the assembled espresso maker.
Figure 6:
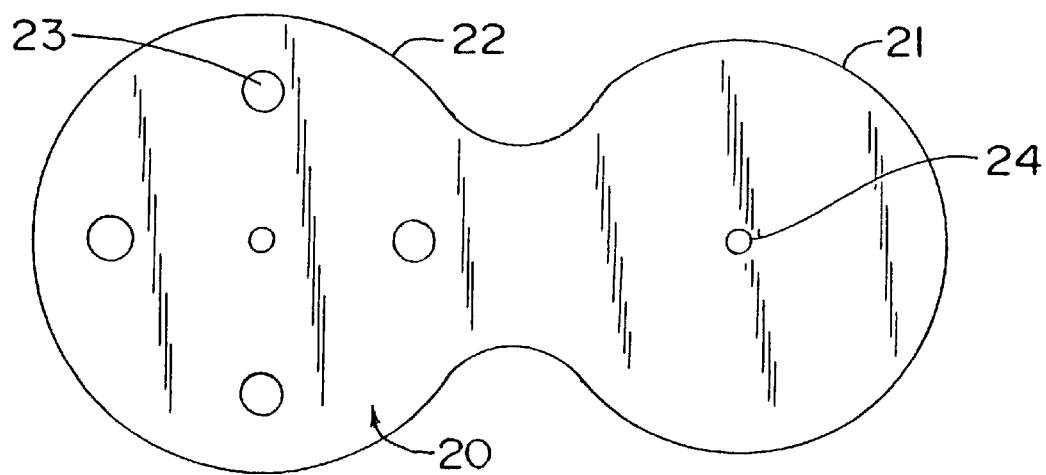
FIG. 6 shows a perspective view of the underside of the cover of the espresso maker according to the invention.

Referring now in detail to the drawings and, in particular, FIGS. 1–3, there is shown the portable espresso maker 10 according to the invention. Espresso maker 10 comprises an outer housing 11, which rests on a tray 20, and a cover 12. An exit spout 15 extends from cover 12 to dispense coffee into cup 80, which can be positioned in cup holder 21 on tray 20. Tray 20 is also shown in FIG. 6, which also shows a plurality of ventilation holes 23 and 24 therein.

There is a water chamber 30 disposed within housing 11 for holding water within cavity 36. Water chamber 30 has a recess 35 on its underside to accommodate a heating element 40 positioned therein. Heating element 40 is connected to a plug connection (not shown) for connecting heating element 40 to a power source. The plug connection can be either a standard wall plug for home or office use, or can be an adapter for connecting heating element 40 to the cigarette lighter of a moving vehicle. Both types of plug connections are well known in the art and are not discussed in detail here.

Water chamber 30 fits snugly within housing 11 so that O-ring 33 fits around groove 31 on water chamber 30 which then slides within housing 11 so that O-ring 33 nests within groove 16 on housing 11. O-ring 33 creates a tight fit between water chamber 30 and housing 11 so that no adhesive is needed.

Housing 11 has a plurality of external threads 13 for connecting with internal threads 14 on cover 12 to seal espresso maker 10 closed during operation. It is important to create an air-tight seal during operation because proper espresso preparation requires water flow under high pressure, which would not be possible if there were air leaks in the machine.

Figure 4:
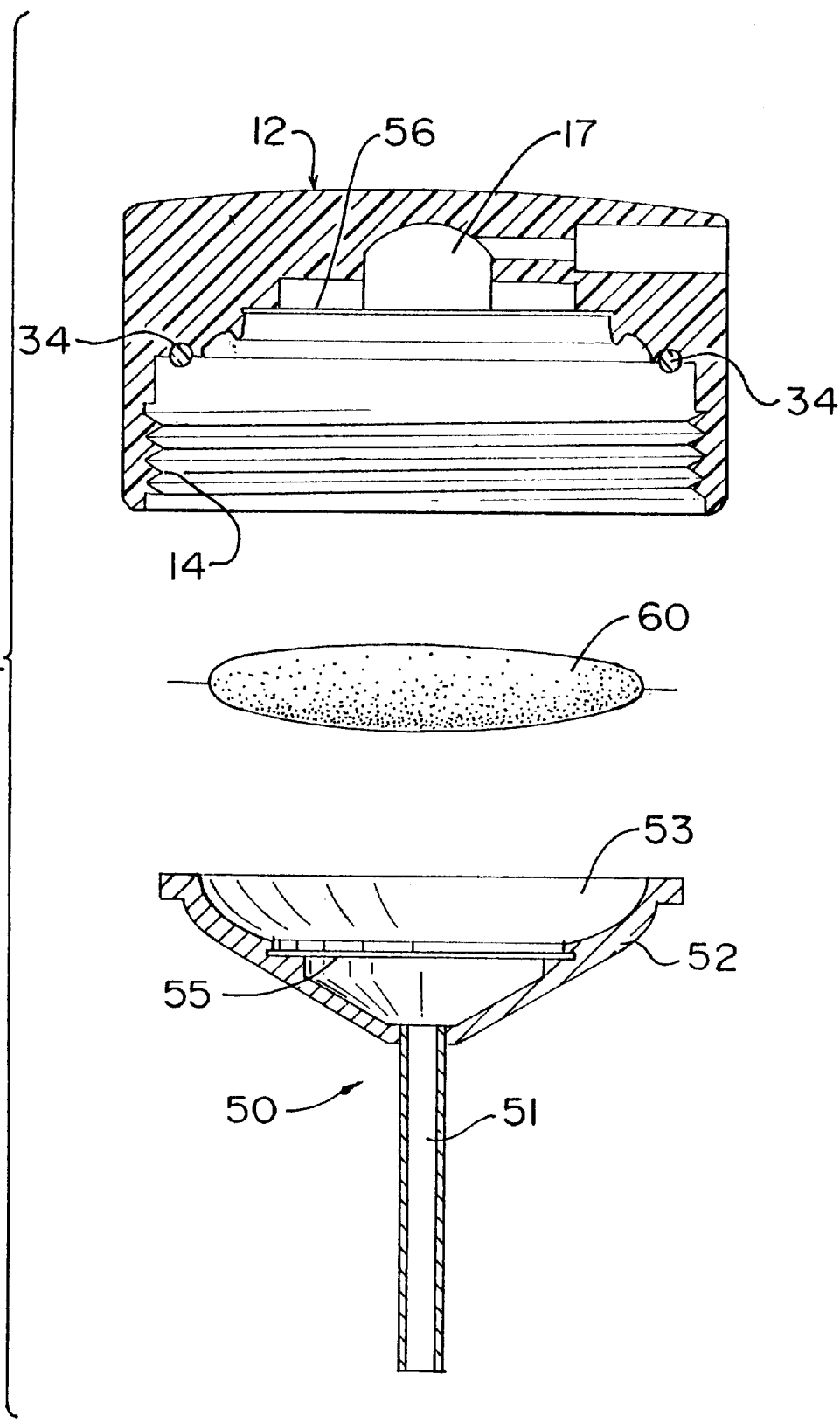
FIG. 4 shows an enlarged cross-sectional view of the filter assembly of the espresso maker according to the invention.

One embodiment of the filter assembly 50 is shown in FIGS. 2–4. Filter assembly 50 comprises a hollow stem 51 connected to a coffee chamber 52 having a recess 53. A screen 55 is positioned at a lower portion of recess 53 for supporting a coffee packet 60 thereon. Coffee packet 60 is a commercially available packet having paper filter material on the outside and a measured portion of ground espresso within.

Cover 12 has on its underside a water passage 17 leading to exit spout 15, and recess 18 surrounding water passage 17. A mesh screen 56 is positioned over recess 18. As shown in FIG. 3, screens 55 and 56 hold and compress coffee packet 60 within filter assembly 50 when cover 12 is fastened to housing 11. O-rings 33 and 34 serve to further compress the edges of coffee packet 60 and create an air-tight seal within espresso maker 10.

Figure 7:
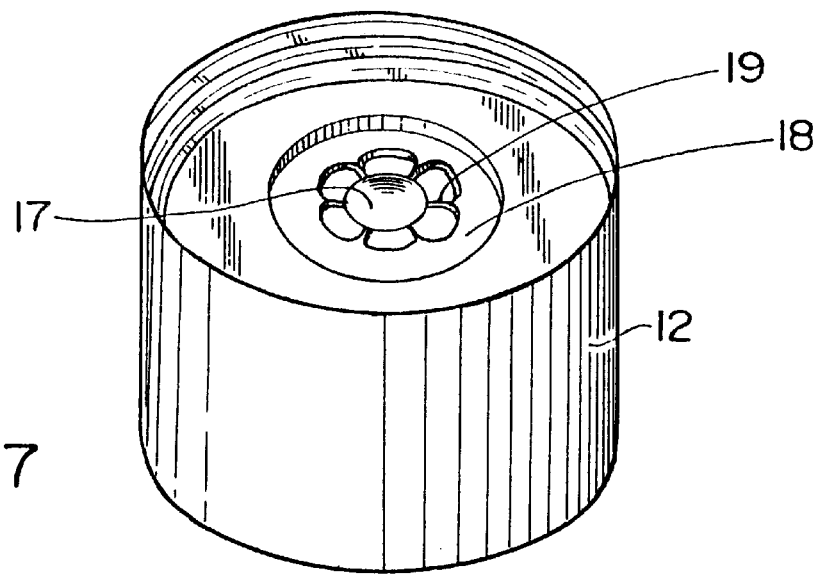
FIG. 7 shows a detailed view of the underside of the cover of the espresso maker according to the invention.

To further enhance the espresso making capability of espresso maker 10, the underside of cover 12 has a plurality of ridges 19 within recess 18, as shown in FIG. 7. Ridges 19 act to press on coffee packet 60 through screen 55 and efficiently compress coffee packet 60, while still allowing the flow-through of espresso out to exit spout 15. Preferably, ridges 19 extend in a hub-and-spoke configuration to provide uniform compression with optimum flow-through.

Figure 5:
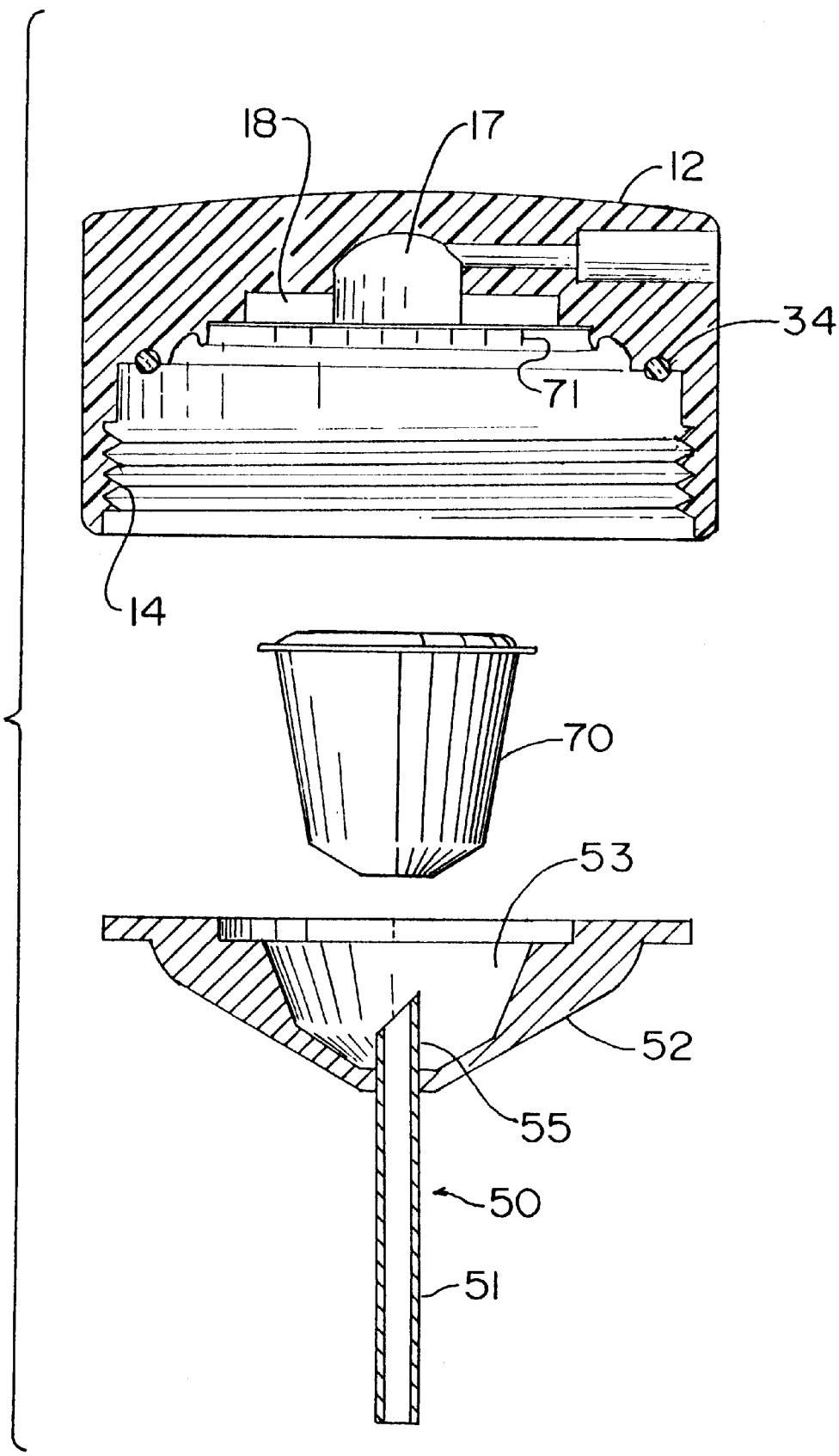
FIG. 5 shows an enlarged cross-sectional view of the filter assembly of an alternative embodiment of the invention.

An alternative embodiment of filter assembly 50 is shown in FIG. 5. In this assembly, coffee container 70 is a foil container containing a premeasured amount of compressed espresso. Such a container is commercially available and manufactured by Néstle. To use coffee container 70, filter assembly has a puncture blade 55 extending up from the bottom of recess 53. Blade 55 punctures the bottom of coffee container 70 when container 70 is placed within recess 53. The underside of cover 12 has a plurality of spikes positioned thereon to puncture the top of coffee container 70 when cover 12 is screwed onto housing 11. Once punctured, water can then pass through container 70 to brew espresso.

Since container 70 holds the espresso in a compressed state, no screens are needed to compress the coffee.

The operation of both embodiments is as follows: Water chamber 30 is filled with water and heating element 40 is connected to a power source, either a wall outlet or an automobile cigarette lighter. Coffee packet 60 or coffee container 70 is placed on filter assembly 50 and cover 12 is fastened to housing 11. Now, the interior of espresso maker 10 is sealed tightly by the o-rings. As the water in water chamber 30 heats up, the pressure created by the heat causes the water to travel up stem 51 and pass through the compressed coffee within recess 53. The brewed espresso then travels through water passage 17 and out to cup 80 through exit spout 15. Espresso maker 10 allows the user to make a single cup of properly brewed espresso in just a few minutes in an automobile, or other moving vehicle, and also in a home or office setting.

Accordingly, while only a few embodiments of the present invention have been shown and described, it is obvious that many changes and modifications may be made thereunto without departing from the spirit and scope of the invention.

What is claimed is:

1. A portable espresso maker, comprising:
   a housing having a side wall with a top edge defining a cavity;
   a water chamber disposed within the cavity, said water chamber having a bottom, a side wall with a top edge and an o-ring mounted on said top edge;

a heating element disposed adjacent the bottom of the water chamber;

means for connecting the heating element to a power source;

a bottom tray for holding the housing;

a cup positioned on the bottom tray adjacent the housing;

a filter assembly positioned within the water chamber, said filter assembly comprising:
(a) a filter tube;
(b) a reservoir connected to a top end of the filter tube, said reservoir having a bottom and side walls; and
(c) a mesh screen extending over the bottom of the reservoir to divide the reservoir into upper and lower sections;

a cover removably connected to the housing and the top edge of the side wall of the water chamber, said cover having a top and a side wall and comprising:
(a) an o-ring engaging the o-ring mounted to the water chamber to create an air-tight seal between the water chamber and the cover when the cover is mounted to the housing;
(b) a concave recess beneath the top;
(c) a screen extending over the concave recess;
(d) a plurality of ridges positioned within the recess and extending to the screen; and
(e) an exit spout extending from the recess out of the cover, wherein a prepackaged coffee packet is placed between the screen of the filter element and the screen of the cover and is compressed by mounting the cover to the housing such that said ridges press against the screen of the cover element to compress the coffee further, and wherein water in the water chamber is heated by the heating element and travels up through the filter tube and through the coffee packet between the screens and exits out the exit spout into the cup.

2. The portable espresso maker according to claim 1, wherein the heating element is connected to an automobile cigarette lighter.

3. The portable espresso maker according to claim 1, wherein the ridges in the cover are arranged to extend outward from a central point.

4. The portable espresso maker according to claim 1, wherein the water chamber is made of steel and the cover and housing are made of acetal.

5. The portable espresso maker according to claim 1, wherein the bottom tray has indentations for the housing and the cup to keep the cup and housing from spilling over in turbulence.

6. The portable espresso maker according to claim 1, wherein the cover has internal threads and the housing has external threads and the cover is screwed onto the housing via said threads.

7. A portable espresso maker, comprising:

a housing having a side wall with a top edge defining a cavity;

a water chamber disposed within the cavity, said water chamber having a bottom, a side wall with a top edge and an o-ring mounted on said top edge;

a heating element disposed adjacent the bottom of the water chamber;

means for connecting the heating element to a power source;

a bottom tray for holding the housing;

a cup positioned on the bottom tray adjacent the housing;

a filter assembly positioned within the water chamber, said filter assembly comprising:
(a) a filter tube,
(b) a reservoir connected to a top end of the filter tube, said reservoir having a bottom and side walls, and
(c) a puncture blade mounted to the filter tube and extending into the reservoir;

a cover engaging the housing and the top edge of the side wall of the water chamber said cover having a top and a side wall and comprising:
(a) an o-ring engaging the o-ring mounted to the water chamber to create an air-tight seal between the water chamber and the cover;
(b) a concave recess beneath the top;
(c) a plurality of spikes extending down from the concave recess;
(e) an exit spout extending from the recess out of the cover, wherein a prepackaged coffee packet is placed between in the recess of the filter element and compressed by mounting the cover to the housing such that said blade punctures a bottom surface of the coffee packet and said spikes puncture a top surface of the coffee packet, and wherein water in the water chamber is heated by the heating element and travels up through the filter tube and through the coffee packet and exits out the exit spout into the cup.

8. The portable espresso maker according to claim 7, wherein the heating element is connected to an automobile cigarette lighter.

9. The portable espresso maker according to claim 7, wherein the ridges in the cover are arranged to extend outward from a central point.

10. The portable espresso maker according to claim 7, wherein the water chamber is made of a material selected from the group consisting of stainless steel and teflon-coated aluminum and the cover and housing are made of acetal.

11. The portable espresso maker according to claim 7, wherein the bottom tray has indentations for the housing and the cup to keep the cup and housing from spilling over in turbulence.

12. The portable espresso maker according to claim 7, wherein the cover has internal threads and the housing has external threads and the cover is screwed onto the housing via said threads.

13. The portable espresso maker according to claim 1, wherein the housing has an internal groove disposed immediately below its top edge and wherein the water chamber has an external groove disposed below its top edge, and further comprising an O-ring disposed within the groove on the water chamber and the groove on the housing to seal the water chamber to the housing.

* * * * *